United States Patent
Wood et al.

[11] 3,839,848
[45] Oct. 8, 1974

[54] METHOD OF AND APPARATUS FOR CLEANING AIR

[75] Inventors: Charles D. Wood, San Antonio; John M. Clark, Jr., Seguin, both of Tex.

[73] Assignee: Southwest Research Institute, San Antonio, Tex.

[22] Filed: Dec. 23, 1971

[21] Appl. No.: 211,272

[52] U.S. Cl............... 55/96, 55/97, 55/293, 55/300, 55/302, 55/324, 55/327, 55/430, 55/484
[51] Int. Cl............................................ B01d 50/00
[58] Field of Search..... 55/1, 96, 97, 112, 124–126, 55/283, 291, 293, 300, 304, 305, 302, 321, 322, 324, 327, 342, 430, 350, 484; 210/332, 131

[56] References Cited
UNITED STATES PATENTS

| 211,033 | 12/1878 | Martin .................... 55/288 |
| 2,717,658 | 9/1955 | Bethea et al. ............. 55/97 |
| 2,722,995 | 11/1955 | Kins ...................... 55/304 |
| 3,397,034 | 8/1968 | Tulleners et al. ........ 55/DIG. 30 |
| 3,411,272 | 11/1968 | Cameron ................. 55/310 |
| 3,521,428 | 7/1970 | Dollinger et al. ........ 55/97 |
| 3,756,416 | 9/1973 | Wood ..................... 55/96 |

FOREIGN PATENTS OR APPLICATIONS

| 812,501 | 4/1959 | Great Britain ............ 55/277 |
| 117,763 | 12/1926 | Switzerland ............. 55/300 |
| 1,012,805 | 7/1957 | Germany ................. 55/304 |

*Primary Examiner*—Bernard Nozick
*Attorney, Agent, or Firm*—Jefferson D. Giller; James F. Weiler; William A. Stout

[57] ABSTRACT

Method and apparatus for filtering particles of dust drom air by collecting the dust from the air and agglomerating the particles of dust to form larger particles or globs of dirt and thereafter removing the globs of dirt by an inertial separator. Collecting the articles of dust on a filter until the collected particles agglomerate, and periodically reversing the filter relative to the air flow for dumping the agglomerated particles downstream for more efficient removal by an inertial separator. Jarring the filter for separating the agglomerated particles from the filter.

6 Claims, 10 Drawing Figures

Charles D. Wood
John M. Clark, Jr.
INVENTORS

BY
William G. Stout

ATTORNEYS

PATENTED OCT 8 1974  3,839,848

Charles D. Wood
John M. Clark, Jr.
INVENTORS

BY James F. Weiler
William E. Stout

ATTORNEYS

Charles D. Wood
John M. Clark, Jr.
INVENTORS

METHOD OF AND APPARATUS FOR CLEANING AIR

BACKGROUND OF THE INVENTION

The present invention relates to a method and apparatus for cleaning dust and other foreign particles from a moving air stream. A conventional inertial separator such as a centrifugal type of filter or the cyclone type of separator has a normal separating efficiency of approximately 85% when removing thoroughly disaggregated small particles of dust with a diameter of about 10 microns from the air stream. However, if the dust in the air stream is in the form of large particles or globs the separating efficiency of the separator is greater than 99 percent.

Therefore, the present invention is directed to an apparatus and method in which the small particles of dust in a moving air stream are collected and agglomerated and are periodically dumped downstream and the agglomerated particles are removed by a separator.

SUMMARY

The present invention is directed to collecting particles of dust from the air, agglomerating the collected particles of dust to form larger particles of dirt, and removing the agglomerated dirt from the air stream by a separator.

A still further object of the present invention is the method of cleaning and filtering small particles from a flowing stream of air by collecting the small particles on a filter until the collected particles agglomerate to form larger particles, and periodically reversing the filter relative to the air stream and jarring the filter to loosen and dump the larger particles downstream, and thereafter removing the larger particles from the downstream air by an inertial separator.

Yet a further object of the present invention is the provision of filter means including a plurality of filter panels rotatably mounted for alternate rotational movement for placing each side of each panel alternately upstream and downstream and the edges of adjacent panels engaging each other at the limits of rotational movement to form a unitary filter, with means for rotating each of the filter panels from the upstream side to the downstream side in preparation for dumping wherein spring means yieldably act to move the filter means downstream against stop means, and cam means are provided for moving the filter means upstream against the spring means and releasing the filter means for allowing the spring means to impact the filter means against the stop means for dumping the agglomerated dust for removal by an inertial separator.

Still a further object of the present invention is the provision of a filter means for collecting and agglomerating particles of dust and reversing the flow direction of the air through the filter for removing the collected dust from the filter.

BRIEF DESCRIPTION OF THE PREFERRED EMBODIMENT

Figure 1:
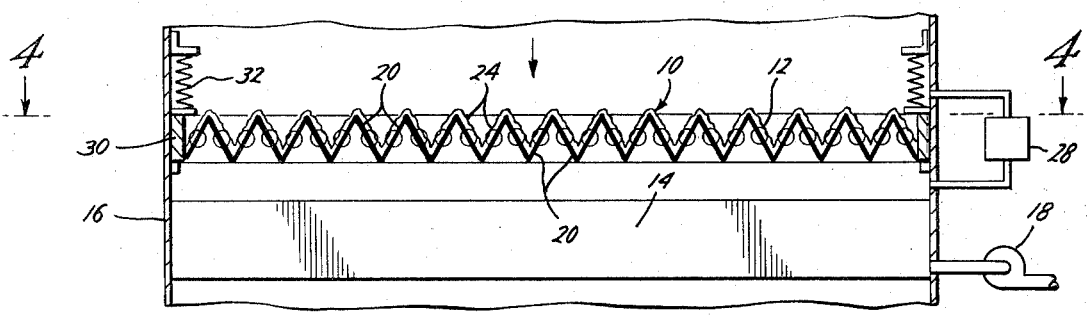
FIG. 1 is an elevational view, partly schematic and partly in cross section, illustrating one form of the present invention with the filter in position filtering the air.
Figure 2:
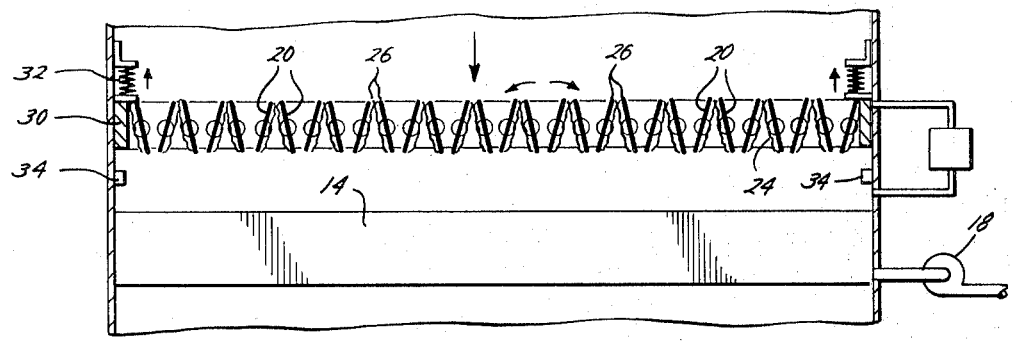
FIG. 2 is a view similar to FIG. 1 wherein the filter panels are in the process of being reversed and simultaneously being moved upstream.
Figure 3:
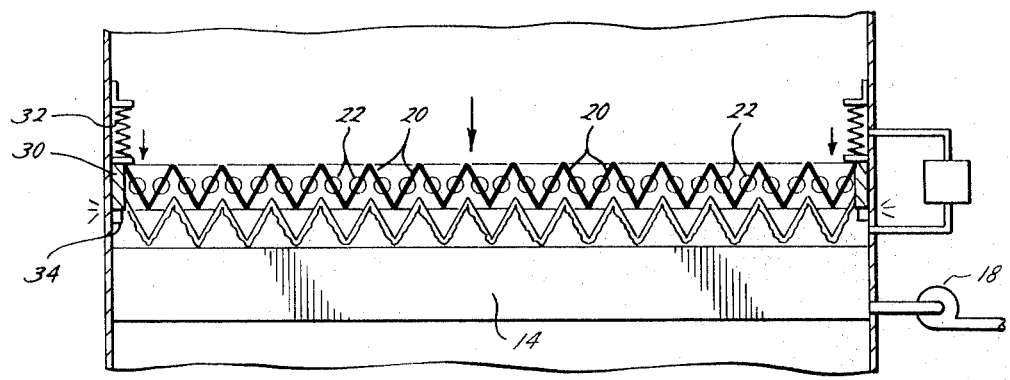
FIG. 3 is a view similar to FIGS. 1 and 2 wherein the filter has been reversed and is in the process of being jarred to remove the accumulated and agglomerated dust now on the downstream side of the filter.

Referring now to the drawings, and particularly to FIGS. 1-3, one form of the apparatus of the present invention for cleaning a flowing stream of air is generally indicated by the reference numeral 10 and generally includes a filter 12 and an inertial separator 14, both of which is placed in a duct 16 through which a stream of air flows.

The present invention is based upon the fact that an inertial separator such as a centrifugal type or a cyclone type of separator has a normal separating efficiency of approximately 85 percent when removing thoroughly disaggregated small particles of dust with diameters of about 10 microns from an air stream. However, if the dust in the air stream is enlarged particles or globs, the efficiency of the separator is greater than 99 percent. Therefore, the present invention is directed to providing a filter 12 placed upstream from the inertial separator 14 to collect the small particles of dust from the air and agglomerating the small particles to form larger particles or globs of dirt, for example only having a particle size of thousands of microns, which can then be dumped downstream to a separator and successfully removed to provide a cleaning system having a filtering air efficiency in excess of 95 percent.

The separator 14 may be of any suitable type of conventional separator such as a Donaldson Strata-Panel or a Gianotti Ballistic Separator, or some similar type which is relatively shallow in depth with a full face flow capability and having a dirty air scavenge pump 18.

The filter means 12 is positioned upstream from the separator 14 for filtering the air and collecting the small particles from the air stream and agglomerating the particles to form large particles or globs of dirt which can be periodically dumped downstream for removal by the separator 14. As best seen in FIGS. 1-5, the filter means 12 may include a plurality of filter panels 20, each of which is rotatably mounted on a separator rod 22, for alternate rotational movement for alternately placing side 24 of each panel alternately facing upstream, as shown in FIG. 1, for filtering the air and alternately placing downstream as shown in FIGS. 2 and 3 for dumping the agglomerated particles of dirt. Opposite filter side 25 is going through the opposite cycle. Preferably, each of the filter panels 20 is rectangularly shaped in cross section whereby the edges 26 of each filter panel 20 will seal with the edges 26 of adjacent filter panels 20 to provide a unitary filter to insure that all of the air flowing through the duct 16 is filtered. Filter panels 20 may be of any conventional filter media that provides surface filtration, rather than in depth filtration, for ease of removing the agglomerated dust. Any type of hard surface, woven filter media would be satisfactory as the dust holding capacity is not an important requirement as the agglomerated particles can be dumped as often as necessary.

Thus, the filter 12 acts to collect the small particles of dust in the air on the upstream side of the filter as best seen in FIG. 1. In addition to collecting on the upstream side of the filter, the dust becomes agglomerated to form larger particles or globs of dirt. A predetermined amount of agglomerated dust or cake build up on the filter 12 on the upstream side can be measured by a differential pressure sensor 28. The sensor 28 measures the differential pressure drop across the filter 12, and the individual filter panels 20 are then rotated about their individual supporting rods 22, as will be more fully described hereinafter, to place the dust cakes or agglomerated particles on the downstream side of the filter 12, as best seen in FIG. 2.

In addition to the filter panel 20 being rotated, it is desirable to jar the filter 12 in order to more completely remove the built up dirt cake by shaking the filter and the agglomerated dust which is now on the downstream side of the filter 12. Thus, and referring to FIG. 2, as the panels 20 are being rotated, and the frame 30 carrying the entire filter 12 is being moved upstream against spring means such as springs 32. After the filter panels 20 have fully rotated so that adjacent panels are resealed at their edges, the movable frame 30 reaches the limit of upstream travel and is released to be driven downstream by the springs 32 to impact against stops 34 after obtaining satisfactory momentum, all as best seen in FIG. 3. The impact or slamming of the filter frame 30 against the stops 34 will shake the accumulated dust 36 from the filter 12 causing the agglomerated dirt to travel downstream to the inertial separator 14 where it may be efficiently removed. Of course, if one impact does not suitably clear the dust cake from the downstream side of the filter 12, additional impacts may be provided if necessary.

Figure 4:
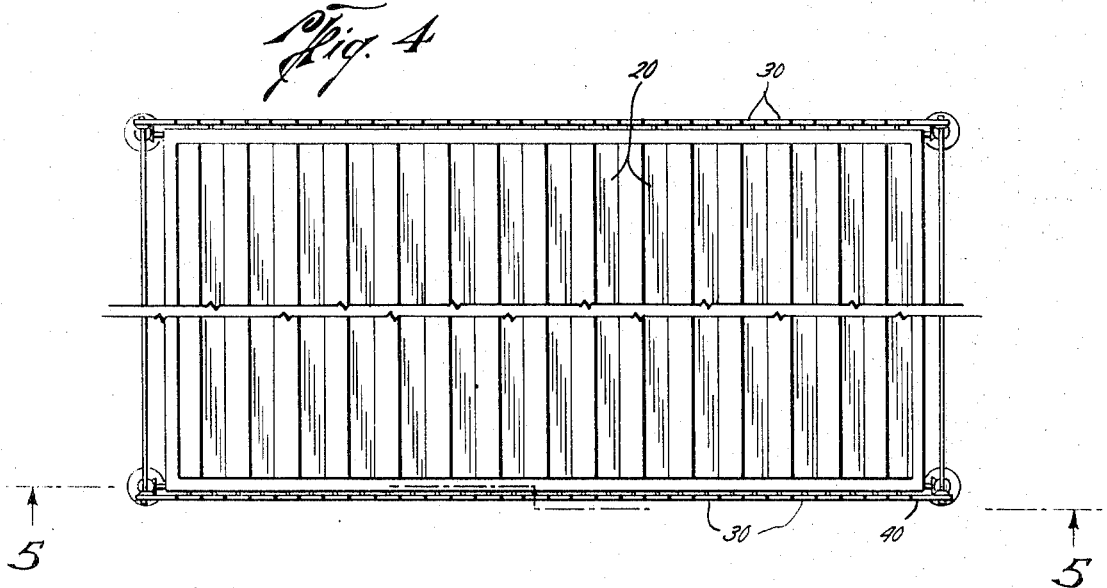
FIG. 4 is a top plan view of the filter of FIGS. 1-3.
Figure 5:
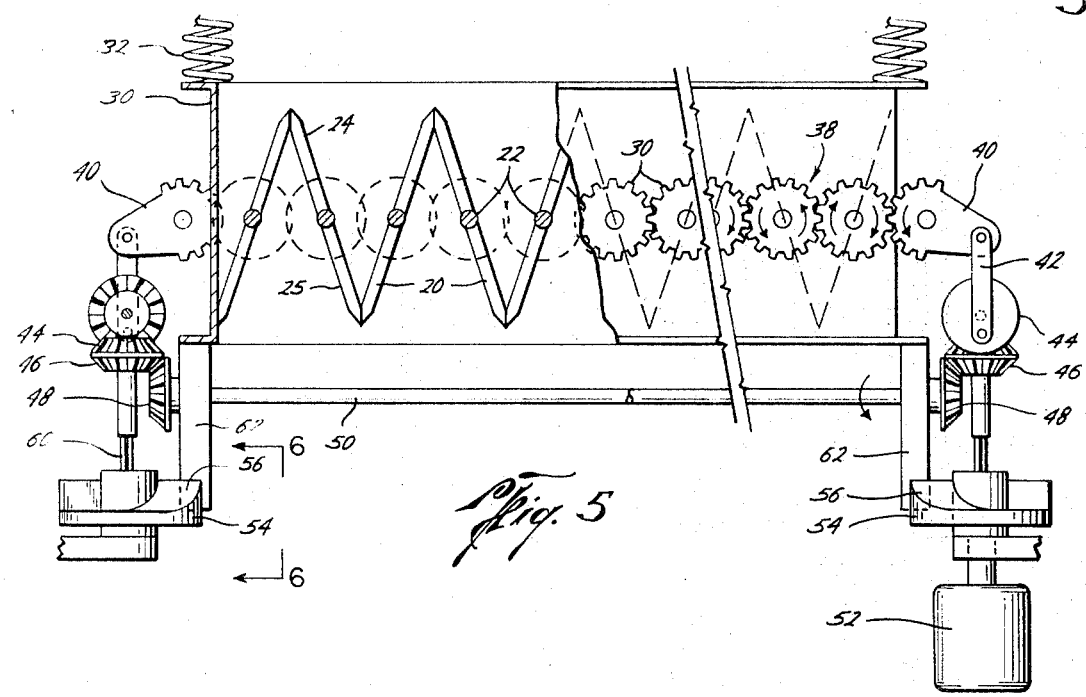
FIG. 5 is an enlarged cross-sectional view taken along the line 5—5 of FIG. 4.
Figure 6:
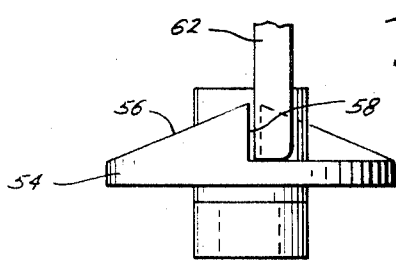
FIG. 6 is a cross-sectional view taken along the line 6—6 of FIG. 5, FIGS. 7 and 8 are elevational views, partly schematic illustrating another embodiment for collecting dust and cleaning the filter by reversing the direction of air flow through the filter by directing the air in one direction in FIG. 7 and reversing the direction of flow of air through the filter in FIG. 8, and FIGS. 9 and 10 are elevational views, in cross section and partly schematic illustrating a further embodiment reversing the direction of air flow through the filter, one direction of air flow being shown in FIG. 9 and the reverse flow of air through the filter being shown in FIG. 10.

While any suitable mechanism may be provided to rotate the filter panels 20 and to move the filter frame 30 upstream and release it and impact it against the stops 34, to place high inertial loads on the dust cake to loosen it from the filter 12, one suitable mechanism is shown in FIGS. 4, 5 and 6. Thus, each filter panel 20 is rotatably mounted on a shaft 22 and each shaft 22 is provided with a gear 30 on each end of the shafts 22 at the sides of the filter frame. Each gear 30 is meshed with an adjacent gear 30 on the adjacent panel rod 22. In this way when a particular gear 30 is turned clockwise, the adjacent connected gears 30 are rotated counterclockwise which provides the motion to reverse all of the filter panels 20. Thus the dirty side 24 of the filters 20 facing the upstream direction are moved to face the downstream direction, and the clean side 25 of the filters 20 on the downstream side are rotated to the upstream side and into a filtering position and the edges 26 of the filter panels 20 are moved together to form a dust tight seal. On the next cycle reversing the filter panels 20 places them in their original position.

Thus, each set of gears 30 on each side of the filter frame 30 forms a gear train generally indicated by the reference numeral 38. Each gear train 38 may be actuated by half gear bell cranks 40, and thus by providing an uneven number of filter panels 20, all of the half gear bell cranks 40 can be moved upwardly and downwardly simultaneously to provide the correct filter panel rotation for all of the individual filter panels 20. The half gear bell cranks 40 are moved upwardly and downwardly by a link 42 pivotally connected to bevel gears 44, all of which is synchronized by a series of idler bevel gears and cross shafts. Thus, the double idler bevel gears 46 are connected to one or more bevel gears 48 which are connected to cross shafts 50 to transmit rotation to all corners of the filter 12.

Motion of the gear trains is initiated by a gear reducer motor unit 52 positioned at one corner of the frame which upon being actuated by the differential pressure sensor 28 (FIGS. 1–3) rotates through 180°. Motor 52 is connected to a cam 54 having two 180° circular cam ramps 56 followed by a drop-off shoulder 58. The cam 54 is in turn connected to the double bevel idler gears 46 through a sliding spline coupling 60. The sliding spline coupling 60 permits vertical movement of the filter frame 30 while the cam 54 remains fixed. As each of the cams 54 rotates 180° cam followers 62 ride up each of the circular ramps 56 lifting all four corners of the filter frame 30 against the action of the springs 32. As the cams 54 finish their 180° of rotation, the cam followers 62 drop off the drop-off shoulder 58 thereby allowing the springs 32 to provide sufficient velocity to the filter 12 to cause a shock deceleration loading to be applied to the filter 12 as the cam followers impact the cam base 64 to cause the agglomerated dust cake on the downstream side of the filter 12 to break loose from the filter surface and travel downstream as shown schematically in FIG. 3.

Thus each of the cams 54 have two 180° cam ramps 56 and drop-off shoulders 58 thereon and the shaft of the motor 58 rotates only 180° for each snap action cleaning of one side of the filter. Thus, the first 180° of rotation moves the link 42 upwardly which in turn reverses the filter panel 20 surfaces and cleans the first side of the filter by sudden impact deceleration of the filter frame. And after the second side filters and agglomerates the dust the second 180° of rotation moves the link 42 downwardly to again reverse the filter panel surfaces and cleans the second side of the filter frame 12.

Figure 7:
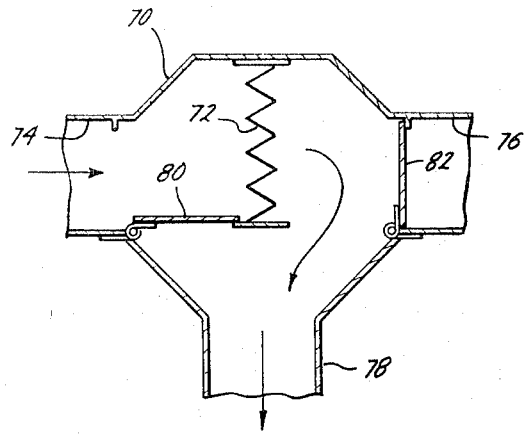
Figure 8:
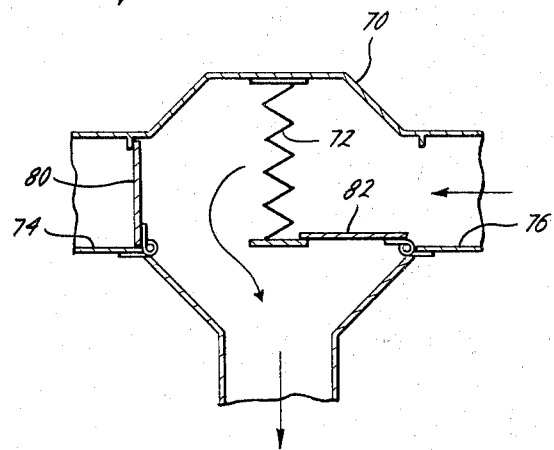

Referring now to FIGS. 7 and 8 another embodiment of the present invention is shown for removing the collected dust from the filter and dumping removed dust downstream to an inertial separator. In this embodiment a housing 70 is provided for containing a filter 72 and air inlet openings 74 and 76 on opposite sides of the filter 72, and an outlet 78 leading to an inertial separator. A closing member 80 and 82 are provided to adjacent the openings 74 and 76 respectively, for alternately allowing the air to enter one inlet, flow through the filter 72 and out the outlet 78. Thus in FIG. 7 the air enters inlet 74, flows through the filter 72 from left to right and out the outlet 78 while inlet 76 is closed. When the dust on the filter builds up, a signal is created, such as by the increase of the pressure drop across the filter, and both closing members 80 and 82 are simultaneously actuated about their pivot connections with 80 closing inlet 74 and member 82 opening air inlet 76, as best seen in FIG. 8. Thus, the air flow through filter 72 is reversed and removes the collected dust from the filter 72 and dumps the dust downstream and out the outlet 78 to a separator. And in addition the members 80 and 82 may upon opening hit a support 86 supporting filter 72 to provide a jar for separating the agglomerated particles from the filter 72.

Figure 9:
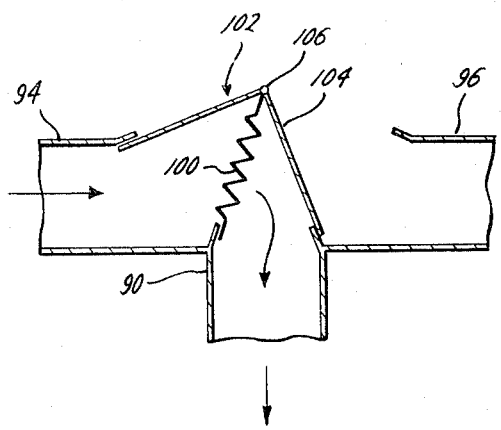
Figure 10:
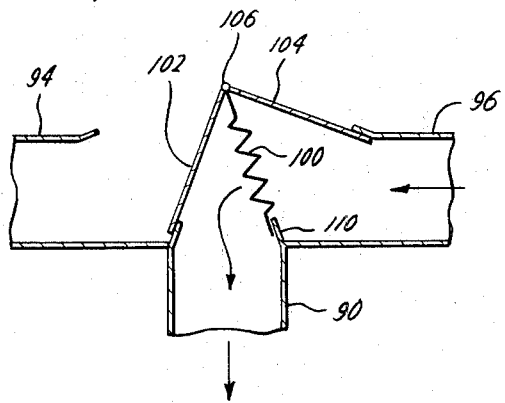

Similarly, the embodiment of FIGS. 9 and 10 includes, inlets 96 and 94, an outlet 90, a filter 100, and closing member 102 and 104. Members 102 and 104 and the filter 100 are pivotally supported about pivot 106. In FIG. 9 the air flows through inlet 94, through the filter 100, and because inlet 96 is closed, out through the outlet 90. When the dust cake builds up on the filter 100, the members 102 and 104 and filter 100 rotate about pivot 106 into the positions shown in FIG. 10 whereby the air flow through the filter is reversed, the filter bumping against stop 110 to jar the collected dust cake and dump it downstream out the outlet 96 to an inertial separator.

Thus in use, the filter panels 20 of FIGS. 1-5 are in position across the path of flow in the air duct 16 with the edges 26 contacting adjacent edges of adjacent panels 20 to provide a dust tight seal. Thus, the filter 12 collects the dust from the flowing air stream on the upstream side of the filter and agglomerates the small dust particles and collects them into larger particles or globs of dirt. After a sufficient amount of dust has been collected to form an agglomerated cake thereon, as determined by the pressure drop across the filter 12 which is sensed by the differential pressure sensing device 28, the individual panels 20 are rotated. Thus the side 24 which has previously been facing upstream rotates and carries the agglomerated dust cake to the downstream side of the filter 12. The pressure sensor 28 actuates the motor 52 which in turn rotates the cams 54 and the double bevel idler gears 46 at all corners of the filter frame 30. Rotation of gears 46 in turn rotate gears 44 which actuate link 42 to move bell cranks 40 and in turn actuate gear trains 38 to rotate the filter panels 20 moving the dirty upstream side of the panels 20 downstream and moving the clean downstream side of the panels 20 to the upstream side. Simultaneously rotation of the cams 54 also carries the cam followers 62 and the frame 30 upwardly against the action of the springs 32.

Completion of the 180° rotation of the motor 52 fully rotates the filter panels 20 to place the dust cake from the downstream side and to reseal the edges of the filter panels 20. Completion of the 180° rotation of the cams 54 also allows the cam followers 62 to drop off of the shoulders 58 and impact on the base 64 by the weight of the filters and the action of the springs 32 to break the dust cakes loose from the filters 12 for efficient removal from the air stream by the inertial separator 14.

Similarly, the embodiments of FIGS. 7-10 pivot the members 80 and 82, and 102 and 104 to reverse the air flow through the filters 72 and 100, respectively, for removing the collected dust from the filters.

The present invention, therefore, is well adapted to carry out the objects and attain the ends and advantages mentioned as well as others inherent therein.

What is claimed is:

1. The method of removing small particles of dust from a flowing stream of air comprising,
    collecting the small particles on one side of a filter panel,
    sensing the pressure drop across the filter for determining when the collected particles agglomerate to form larger particles,
    when the pressure drop increases to a predetermined amount, removing the agglomerated particles downstream by reversing the filter panel relative to the air flow and jarring the filter to loosen the agglomerated particles thereby dumping the agglomerated particles downstream, and
    passing the dumped particles with the downstream air to an inertial separator, and separating the particles from the air, and
    collecting the small particles on the second side of the filter and repeating the second, third and fourth steps of the method.

2. An apparatus for removing small particles of dust from a conduit containing a flowing stream of air comprising,
    filter panel means rotatably positioned in the conduit in the path of flowing air for collecting the small particles of dust on a first side of the filter,
    pressure differential sensing means positioned in the conduit for measuring the pressure drop across the filter thereby determining when the collected particles agglomerate to form larger particles,
    means connected to the filter for rotating the filter panel means for moving the first side downstream whereby the flowing air will act to flush the agglomerated particles downstream and the second side of the filter means may be used for collecting the dust,
    means positioned adjacent the filter for jarring the filter means after the filter has been rotated for dumping the agglomerated particles downstream, and
    an inertial separator means positioned in the conduit and positioned downstream of the filter means for removing the dumped agglomerated particles from the air stream.

3. The apparatus of claim 2 wherein said filter means includes,
    a plurality of filter panels rotatively mounted for placing one side of the panels alternately facing upstream and downstream, each panel adapted to engage the adjacent panels in one rotative position for filtering the entire air stream.

4. The apparatus of claim 2 wherein said jarring means includes,
    means for moving the filter means upstream,
    means for quickly moving the filter means downstream, and
    stop means on the downstream side of the filter against which the filter impacts to remove the large particles therefrom.

5. An apparatus for cleaning dust from a flowing stream of air comprising,
    filter means for collecting small particles of dust to agglomerate the dust including a plurality of filter panels rotatably mounted for rotational movement for placing each side of each panel alternately facing upstream and downstream, the edges of said adjacent panels engaging each other when rotated to form a unitary filter, means connected to the filter means for alternately rotating each of the filter panels from the upstream side to the downstream side for moving the agglomerated particles downstream of the filter, spring means connected to the filter means yieldably acting to move said filter means downstream, stop means downstream of said filter means limiting the downstream movement of the filter means in response to the spring means, cam means for moving said filter means upstream against the spring means and releasing said filter means for allowing the spring means to impact the filter means against the stop means for removing the agglomerated dust, and inertial separator means positioned downstream of said filter means for removing the agglomerated dust from the air stream.

6. The apparatus of claim 5 including, pressure differential sensing means connected across the filter means for measuring the pressure drop across the filter means.

* * * * *